US 10,663,044 B2

(12) United States Patent
Greb et al.

(10) Patent No.: US 10,663,044 B2
(45) Date of Patent: May 26, 2020

(54) ACTUATOR HAVING A PLANETARY ROLLER SCREW DRIVE (71) Applicant: Schaeffler Technologies AG & Co. KG, Herzogenaurach (DE)

(72) Inventors: Peter Greb, Ottersweier (DE); Alexander Dreher, Sinzheim (DE); Lars Schumann, Bühl (DE); László Mán, Ottersweier-Unzhurst (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 246 days.

(21) Appl. No.: 15/562,159

(22) PCT Filed: Mar. 14, 2016

(86) PCT No.: PCT/DE2016/200137
§ 371 (c)(1),
(2) Date: Sep. 27, 2017

(87) PCT Pub. No.: WO2016/155722
PCT Pub. Date: Oct. 6, 2016

(65) Prior Publication Data
US 2018/0340597 A1 Nov. 29, 2018

(30) Foreign Application Priority Data
Mar. 30, 2015 (DE) .......... 10 2015 205 717

(51) Int. Cl.
*F16H 25/22* (2006.01)
*F16H 57/08* (2006.01)
(Continued)

(52) U.S. Cl.
CPC ......... *F16H 25/2252* (2013.01); *F16D 23/12* (2013.01); *F16D 29/005* (2013.01);
(Continued)

(58) Field of Classification Search
CPC ......... F16H 25/2252; F16H 2025/2078; F16H 2025/2271; F16H 57/0497
See application file for complete search history.

(56) References Cited

U.S. PATENT DOCUMENTS 8,082,818 B2 * 12/2011 Sugitani ............. F16H 25/2252
74/424.91
2010/0269616 A1 * 10/2010 Merlet ................ F16H 57/0497
74/424.92
(Continued)

FOREIGN PATENT DOCUMENTS

DE      277308 A5     3/1990
DE     4036209 C1     5/1992
(Continued)

OTHER PUBLICATIONS

Machine Translation of WO 2015/081951, obtained Jul. 30, 2019.*
(Continued)

*Primary Examiner* — Richard W Ridley
*Assistant Examiner* — Brian J McGovern
(74) *Attorney, Agent, or Firm* — Kevin L. Parks (57) ABSTRACT The disclosure relates to an actuator having a planetary roller screw drive comprising a housing having a cylinder chamber and a fluid reservoir forming one common volume and the housing is filled with a hydraulic fluid. The planetary roller screw drive comprises a spindle having a profiling, which meshes with a plurality of planetary rollers, which are arranged around the spindle and are supported at both ends in a planetary roller carrier. The planetary rollers mesh with an inner profiling of an internal ring gear surrounding the planetary rollers and the planetary rollers are supported in a sleeve surrounding the internal ring gear. According to the disclosure, the planetary roller carrier and/or the sleeve comprise one or more flow ducts connecting the interior and
(Continued)

the exterior of a chamber defined radially by the sleeve and axially by the planetary roller carriers to one another.

10 Claims, 6 Drawing Sheets

(51) Int. Cl.
- *F16D 29/00* (2006.01)
- *F16D 23/12* (2006.01)
- *F16H 57/12* (2006.01)
- *F16H 57/04* (2010.01)
- *F16D 41/20* (2006.01)
- *F16H 25/20* (2006.01)

(52) U.S. Cl.
CPC ....... *F16H 57/0497* (2013.01); *F16H 57/082* (2013.01); *F16H 57/12* (2013.01); *F16D 41/206* (2013.01); *F16H 2025/2078* (2013.01); *F16H 2025/2271* (2013.01)

(56) References Cited

U.S. PATENT DOCUMENTS

2012/0217117 A1* 8/2012 Gramann .............. F16D 29/005
                                                                                       192/83
2014/0105768 A1    4/2014  Franz

FOREIGN PATENT DOCUMENTS

| | | | |
|---|---|---|---|
| DE | 102010047800 A1 | 5/2011 | |
| DE | 102010011820 A1 | 9/2011 | |
| DE | 102012221136 A1 | 6/2013 | |
| DE | 102013204561 A1 | 10/2013 | |
| DE | 102012212311 A1 | 1/2014 | |
| DE | 102013201473 A1 | 7/2014 | |
| DE | 102015207391 A1 * | 10/2016 | ......... F16H 25/2252 |
| DE | 102016210190 A1 * | 12/2016 | ............. F16D 23/12 |
| WO | WO-2015081951 A1 * | 6/2015 | ......... F16H 25/2252 |
| WO | 2015131889 A1 | 9/2015 | |

OTHER PUBLICATIONS

Machine Translation of DE 10 2016 210 190, obtained Jan. 9, 2020.*

Machine Translation of DE 10 2015 207 391, obtained Jan. 9, 2020.*

International Search Report for PCT/DE2016/200137; 2 pgs; dated Jul. 5, 2016 by European Patent Office.

* cited by examiner

ACTUATOR HAVING A PLANETARY ROLLER SCREW DRIVE

CROSS-REFERENCE TO RELATED APPLICATIONS

This application is the U.S. National Phase of PCT Appln. No. PCT/DE2016/200137 filed Mar. 14, 2016, which claims priority to German Application No. DE 10 2015 205 717.8 filed Mar. 30, 2015, the entire disclosures of which are incorporated by reference herein.

TECHNICAL FIELD

The present disclosure relates to an actuator having a planetary roller screw drive, which is used in particular for the actuation of a clutch and other vehicle assemblies.

BACKGROUND

Planetary roller screw spindles (also referred to as planetary roller screw drives) have for many years formed part of the prior art and are described, for example, in DD 0277308 A5. The publication DE 10 2010 047 800 A1, for example, discloses a planetary roller screw drive which is contained in a hydrostatic actuator in the form of a hydrostatic clutch actuator, in order to convert a rotational movement generated by an electric motor into an axial movement.

The publication DE 10 2010 011 820 A1 discloses a planetary roller screw drive, having a screw spindle and a nut arranged on the screw spindle, and having a plurality of planets, which are distributed over the circumference and arranged between the screw spindle and the nut, and which are arranged so that they can roll on the inner circumference of the nut and on the outer circumference of the screw spindle. In this solution the planets are provided with a pre-tensioning device, wherein the nut comprises two nut parts axially moveable relative to one another, and wherein the pre-tensioning device comprises a spring element sprung against one of the nut parts. The nut performs two functions, being both a drive component and part of the pre-tensioning device.

Hydraulic operating actuators are known which actuate a clutch by way of a hydraulic actuating line. These differentiate between a pressure chamber and a fluid reservoir, which are connected to one another via a venting hole. Running over the venting hole towards the pressure chamber seals the pressure chamber off from the fluid reservoir, and volume equalization can no longer take place. Here, according to DE 10 2013 204 561 A1 three seals are arranged for sealing off the pressure chamber. Two of the three seals are arranged axially in series. Of these, upon actuation a first seal seals off the pressure chamber from the venting hole and the other, second seal seals the electric motor chamber off from the fluid reservoir. The second seal here is particularly critical with regard to leakage losses, because it serves for sealing off from the atmosphere.

Flooding the inner chamber with coolant and/or lubricant is also known in the case of freewheel clutches (DE 10 2012 221 136 A1).

DE 40 36 209 C1 describes a planetary gear wherein the gear interior is partially filled with lubricating oil and is sealed off from the outside.

In an as yet unpublished document a flooded actuator is described, wherein the fluid chamber and the housing interior form one common volume. Under a relative movement between the spindle and the planetary rollers, however, only a minimal exchange of fluid occurs between the interior of the planetary roller screw drive defined by the sleeve and the remainder of the housing interior.

One disadvantage is the sealing necessary in the case of grease-lubricated planetary roller screw drives, and the space needed for the grease, the grease being subject to ageing. Furthermore, there is no heat energy transfer through the lubricants, making it impossible to cool the planetary roller screw drives. All in all these factors can have a negative influence on the efficiency of the actuator.

SUMMARY

The object of the present disclosure is to develop an actuator which has a simple design construction and which ensures a permanent exchange of lubricant and heat energy transfer. Advantageous embodiments are set forth in the claims and described herein.

The present disclosure relates to an actuator having a planetary roller screw drive, wherein the actuator comprises a housing having a cylinder chamber and a fluid reservoir, wherein the fluid reservoir and the cylinder chamber form one common volume and the housing is filled with a hydraulic fluid and wherein the planetary roller screw drive comprises a spindle having a profiling, which meshes with a plurality of planetary rollers, which are arranged around the spindle axially parallel to the spindle and each have a profiling and are supported at both ends in a planetary roller carrier, wherein the planetary rollers mesh with an inner profiling of an internal ring gear surrounding the former and wherein the planetary rollers are supported in a sleeve surrounding the internal ring gear. According to the disclosure the planetary roller carriers and/or the sleeve comprise one or more flow ducts, which connect the interior and the exterior of the chamber defined radially by the sleeve and axially by the planetary roller carriers to one another.

The flow ducts ensure a constant exchange of lubricant inside the planetary roller screw drive, resulting in permanent lubrication of the rolling contacts. At the same time the heat generated in the planetary roller screw drive is also advantageously dissipated.

In a preferred embodiment the flow ducts are formed in a groove shape on the inside diameter of the planetary roller carriers along the longitudinal axis of the planetary roller carriers.

In particular, the planetary roller carriers have recesses for receiving the planetary rollers, and the flow ducts are arranged circumferentially offset in relation to the recesses. Here a flow duct is preferably arranged between each two adjacent recesses.

The flow ducts in cross section preferably have a radial path.

The hydraulic fluid used as lubricant is advantageously brake fluid, it being possible to add additives to this for optimum lubrication. The elimination of lubrication by means of grease allows the overall space freed up in the planetary roller screw drive to be filled with further planetary rollers.

The sleeve may be of two-part construction, wherein the two sleeve parts are torsionally secured in relation to one another by means of an anti-twist safeguard and are torsionally locked to the rotor of an electric motor. The planetary roller carriers are in turn operatively connected to the sleeve via anti-twist safeguards. The planetary rollers are guided at both ends by the planetary roller carriers and are supported in the latter.

In addition to lubrication by a hydraulic fluid, the possibility moreover exists of a single greasing of the planetary roller screw drive, wherein the grease is mixed with the hydraulic fluid throughout the service life.

The flooded housing advantageously means that no loss of lubricant occurs from the planetary roller screw drive.

BRIEF DESCRIPTION OF THE DRAWINGS

The disclosure is explained in more detail below with reference to the associated drawings, in which.

DETAILED DESCRIPTION

Figure 1:
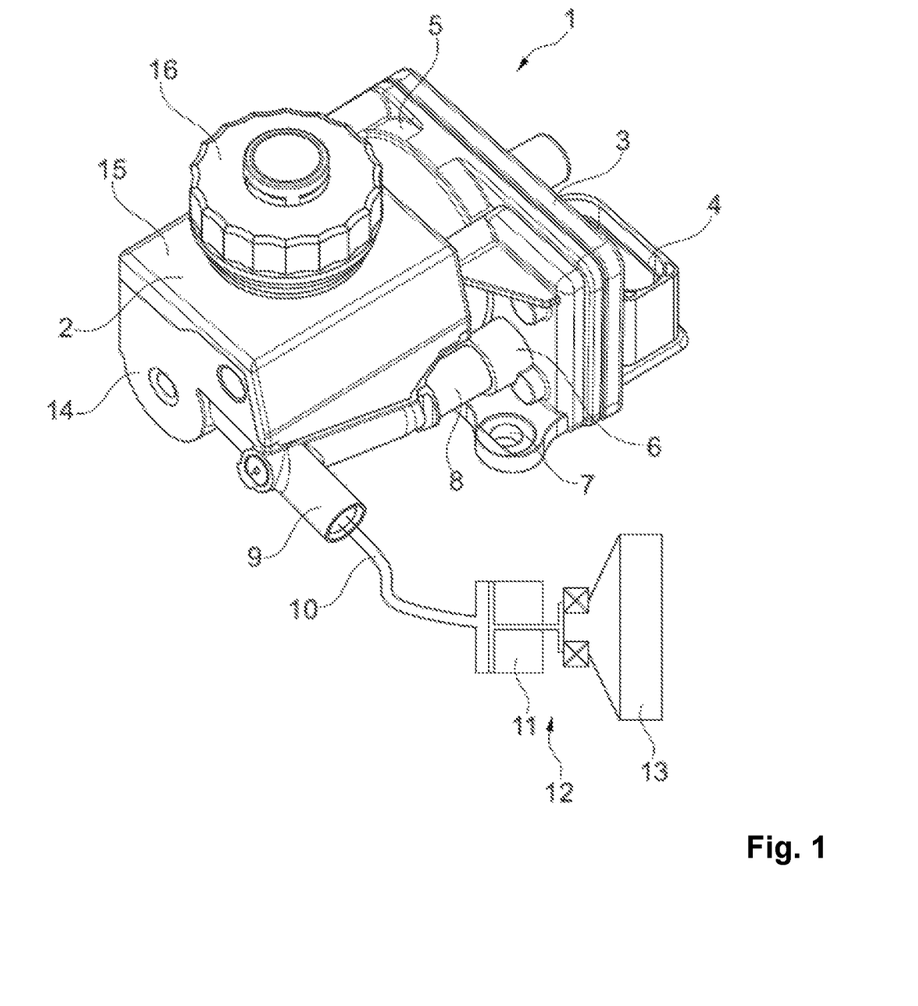
FIG. 1 shows a schematic perspective view of an actuator.
Figure 2:
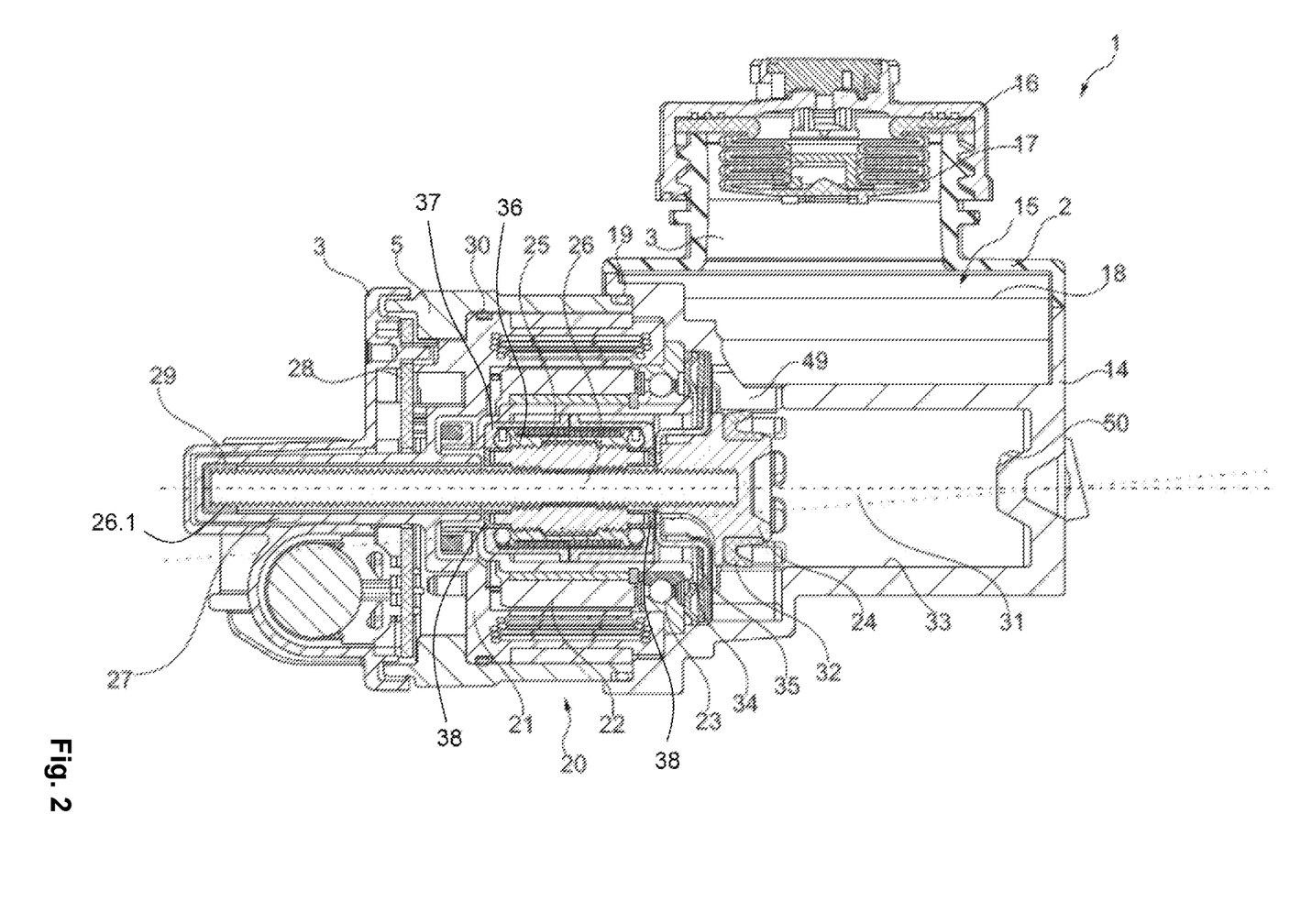
FIG. 2 shows a schematic sectional view of the actuator.

FIGS. 1 and 2 show the actuator 1 having a housing 2, which encloses the active or moving components of the actuator and the volumes holding the hydraulic fluid. On one side the housing 2 comprises an electronics housing 3 with the electronics of a control unit arranged therein, wherein the control unit can be connected by means of a connector, wherein a connector 4 is provided adjacent to the electronics housing 3. The connector 4 here may be embodied as a female or male connector, in which a connector of the other type engages in order to produce an electrical connection. Here the electrical connection is a power supply and/or a data connection for transmitting data or signals.

The housing 2 further comprises a drive housing, which in the case of the exemplary embodiment shown is embodied as an electric motor housing 5. The drive, in this case an electric motor, is arranged in this sub-housing. A pressure sensor connection 6 and a fixing eye 7 for fixing the actuator 1 to a motor vehicle, for example, are provided on this housing part 5. A pressure sensor 8 is fitted to the pressure sensor connection 6. The pressure sensor 8 preferably detects the pressure on the outlet 9 of the pressure line 10, which leads to a slave cylinder 11 of a clutch release device 12 of a clutch 13.

The housing 2 further comprises a housing part 14 as fluid housing, which is connected to the housing 5 of the electric motor. A fluid reservoir 15, which can be closed by a housing cover 16, is arranged on this fluid housing 14. In the exemplary embodiment shown the housing cover 16 is embodied as a screw cover. It may be connected to the housing 2 in some other way, however. The housing cover comprises a volume equalization element 17, which allows a volume equalization in the event of a volume expansion or volume reduction. The volume equalization element 17 is embodied as a flexible bellows, which in particular is spring-tensioned and is biased towards the hydraulic fluid 18 in the reservoir 3. It can thereby be moved into the reservoir 3 in the event of a volume reduction and moved out of the reservoir 3 in the event of an increase in volume.

The housing 2 substantially comprises the housing parts 2 and 14, which at their interface are connected to one another and sealed by means of the seal 19. This seal 19 is preferably an O-ring seal or the like, that is to say a static seal. The seal 19 lies in a seat of the housing 5, which engages in the housing 14, so that the seal 19 rests between the two housings 5 and 14, forming a seal.

The electric motor 20 is arranged in the sub-housing 5 and comprises a stator 21 and a rotor 22, which is rotatable supported in the housing 5 by means of the bearing 23. A mechanism is provided for translating the rotational movement of the rotor 22 into an axial movement of the piston 24. In the exemplary embodiment this mechanism is a spindle mechanism (planetary roller screw drive), which is formed with a rotatable spindle 26. The spindle 26 has a profiling, which is formed in the manner of a thread with elevations and grooves extending between them, wherein the elevations and the grooves run in a continuous spiral in the manner of a helix. The profiling of the spindle 26 meshes with a plurality of planetary rollers 25, which are arranged around the spindle 26 axially parallel to the spindle 26 and each have a profiling. The planetary rollers 25 are supported in a planetary roller carrier 38 at both ends and mesh with an inner profiling of an internal ring gear 36 surrounding the planetary rollers 25. The planetary roller carriers 38 are supported in a sleeve 37 surrounding the internal ring gear 36 and here have flow ducts (not visible). In order to prevent rotational movement of the spindle 26, a rotational brace 27 is provided in the housing 5. A rotational brace 29 fixed to the spindle is also provided, which is arranged as a type of cap on the end of the spindle 26. The electronics housing 3 comprises a circuit board 28, which may constitute the control unit or be a part of the latter. In addition to the seal 19 a further static seal 30 is provided, which is arranged between the wet chamber of the reservoir 15 and the dry chamber 51 of the electronics. It may likewise be embodied as an O-ring seal.

The piston 24 is fixed to one end of the spindle 26 or has a seat in which the spindle 26 engages and in which the spindle is fixed. For sealing the piston off from the cylinder chamber 31 of the piston-cylinder unit, a moving seal 32 is arranged connected to the piston 24. Here a static sealing lip is supported on the piston 24 and a moving sealing lip on the wall 33 of the cylinder chamber 31. A referencing spring 34 with a spring sleeve 35, which spring is supported on the one hand on the housing 2 or 14 and on the other on the piston 24 or on the piston rod, is arranged between the housing 2 and the piston 24. Here the piston rod is embodied as the spindle 26. The referencing spring 34 here is embodied as a disk spring and produces a defined return force on the piston 24 in the area of one of its limit positions.

Figure 3:
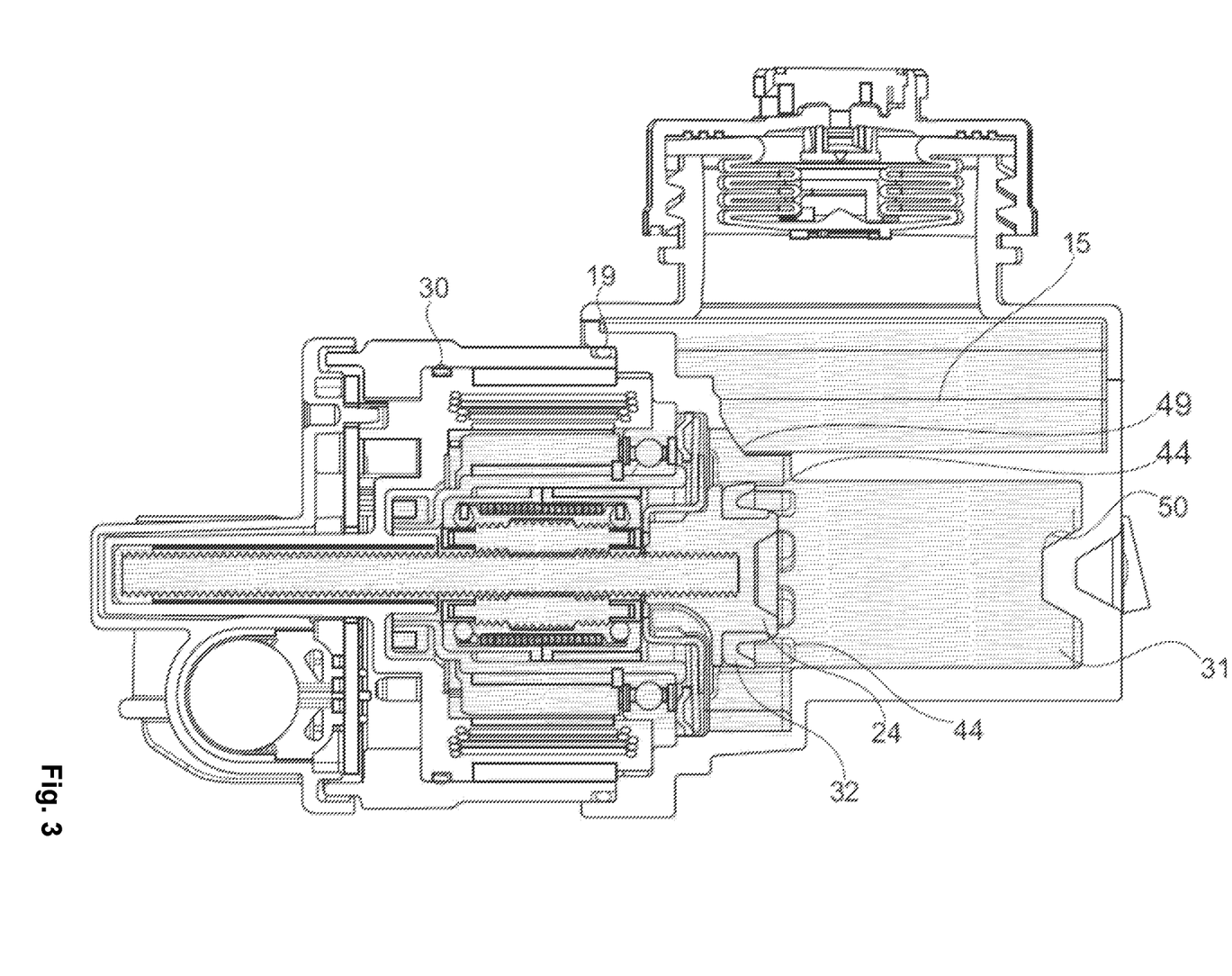
FIG. 3 shows a schematic sectional view of the actuator in an operating position.
Figure 4:
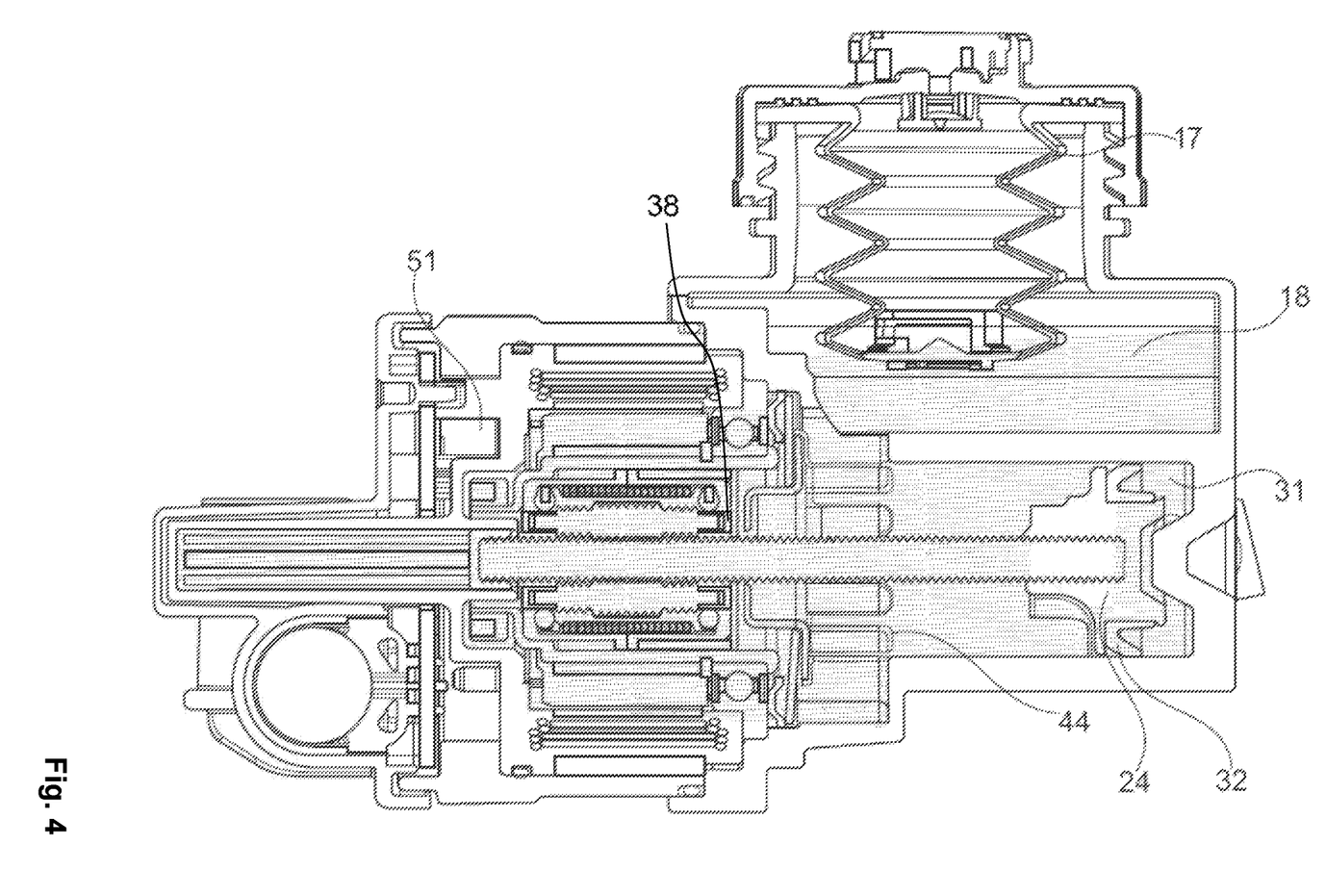
FIG. 4 shows a schematic sectional view of the actuator in a further operating position.

FIGS. 3 and 4 show that substantially the housing 2 is completely flooded with the hydraulic fluid. The hydraulic fluid preferably consists of brake fluid, wherein additional additives are added for an improved lubrication effect. The level of the hydraulic fluid inside the housing 2 is represented by dashes, the planetary roller screw drive also being flooded. If the seal 32 passes over the edge 44 towards the right, the cylinder chamber is closed. If the seal 32 is displaced to the left relative to the edge 44, a fluid connection is formed to the fluid reservoir and the hydraulic fluid can be equalized or a pressure equalization can be performed. The opening 50 serves as a pressure outlet of the cylinder chamber 31.

FIG. 3 here shows that the piston 24 is so far in a retracted position that the fluid connection through the duct 44 between the pressure chamber or the cylinder chamber 31 and the reservoir 18 is ensured. The seal 32 has not yet passed over the edges 44.

FIG. 4 by contrast shows a position of the piston in which the piston is located virtually in its other, extended limit position. The pressure chamber of the cylinder chamber 31 is closed, because the seal 32 has run over the edges 44. The shifting of the piston 24 in order to displace a column of fluid displaces volumes of the hydraulic fluid from the actuator into the pressure line, which leads to extending of the bellows of the volume equalization device 17. If the piston now moves to the left in the plane of the drawing, fluid must be displaced in the direction of the cylinder chamber 31. The flow ducts which according to the disclosure are present in the planetary roller carriers 38 but which are not visible here facilitate the flow through the drive unit considerably.

Figure 5:
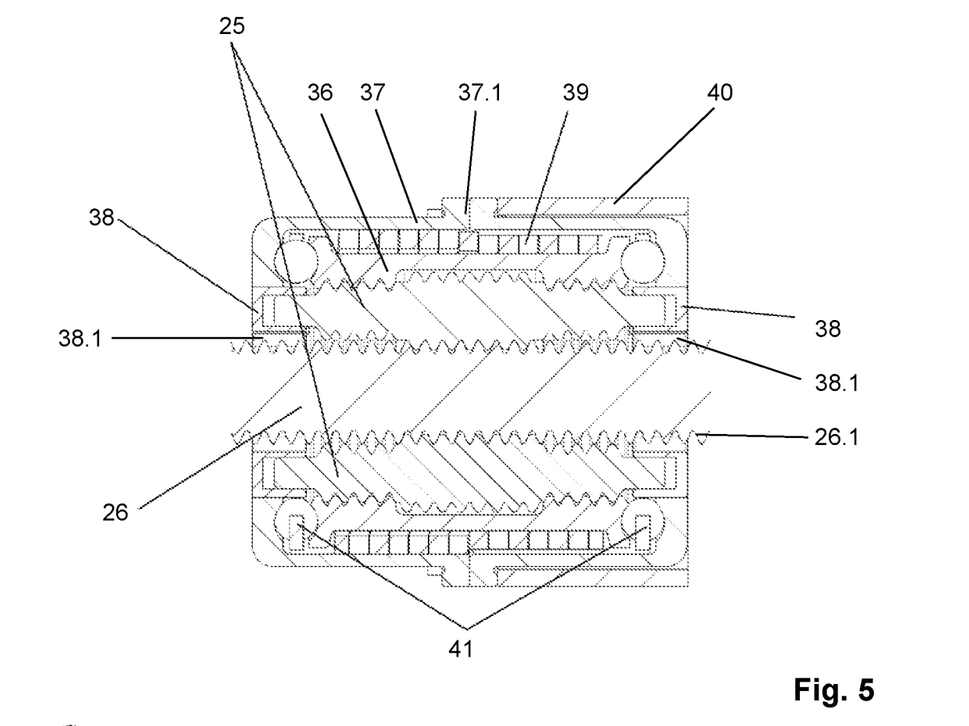
FIG. 5 shows a schematic representation of a planetary roller screw drive in longitudinal section.
Figure 6:
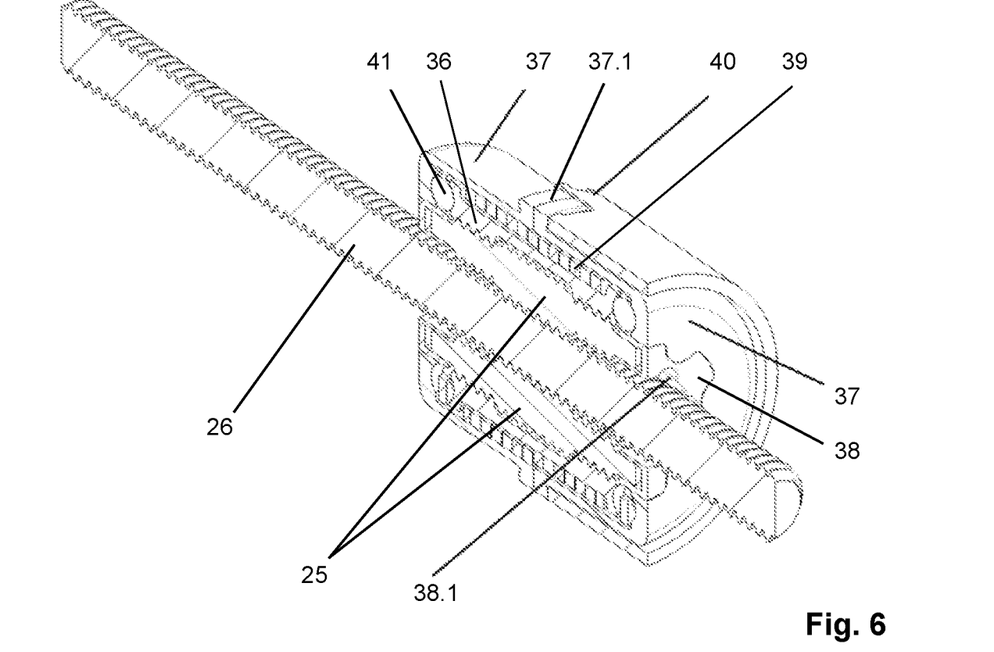
FIG. 6 shows a schematic representation of a planetary roller screw drive.

FIGS. 5 and 6 show the planetary roller screw drive isolated from the actuator. The planetary roller screw drive comprises a spindle 26 with an external thread 26.1 having a pitch. The spindle 26 is rotationally locked to a rotor of the drive (electric motor), not shown, and can be driven by the drive about an axis of rotation. A plurality of planetary rollers 25, which engage with an internal ring gear 36 surrounding the planetary rollers 25, mesh with the spindle 26. Three or a multiple of three planetary rollers 25 are preferably positioned circumferentially around the spindle 26. At both ends the planetary rollers 25 are each rotatably received in a planetary roller carrier 38, the two planetary roller carriers 38 being supported so that they cannot rotate. Each planetary roller carrier 38 is received in an area of a sleeve 37 facing radially inwards at the end, the sleeve being divided into two halves which comprise a radially outward facing flange 37.1 and are rotationally locked to this flange by an anti-twist safeguard 40 and axially fixed to one another. The internal ring gear 36 transmits the axial forces from the planetary rollers 25 into the sleeve 37 via two axial bearings 41 of the planetary roller screw drive. A coil spring 39 is integrated into the planetary roller screw drive as a freewheel mechanism.

The planetary roller carriers 38 have at least one, preferably more flow ducts 38.1, which ensure an optimal flow through the space defined by the sleeve 37 and the planetary roller carriers 38 and consequently also a lubrication of the rolling contacts between the spindle 26, the planets 25 and the internal ring gear 36.

Flooding of the planetary roller screw drive with the hydraulic fluid via the flow ducts produces a constant exchange of lubricant and at the same time a heat energy transfer. The overall space no longer needed for grease can be used for further planetary rollers. The planetary roller screw drive can be given a single greasing, so that the grease is mixed with the hydraulic fluid throughout the service life of the planetary roller screw drive.

The flow ducts 38.1, which according to the disclosure are present in the planetary roller carriers 38, can clearly be seen in FIG. 6.

Figure 7:
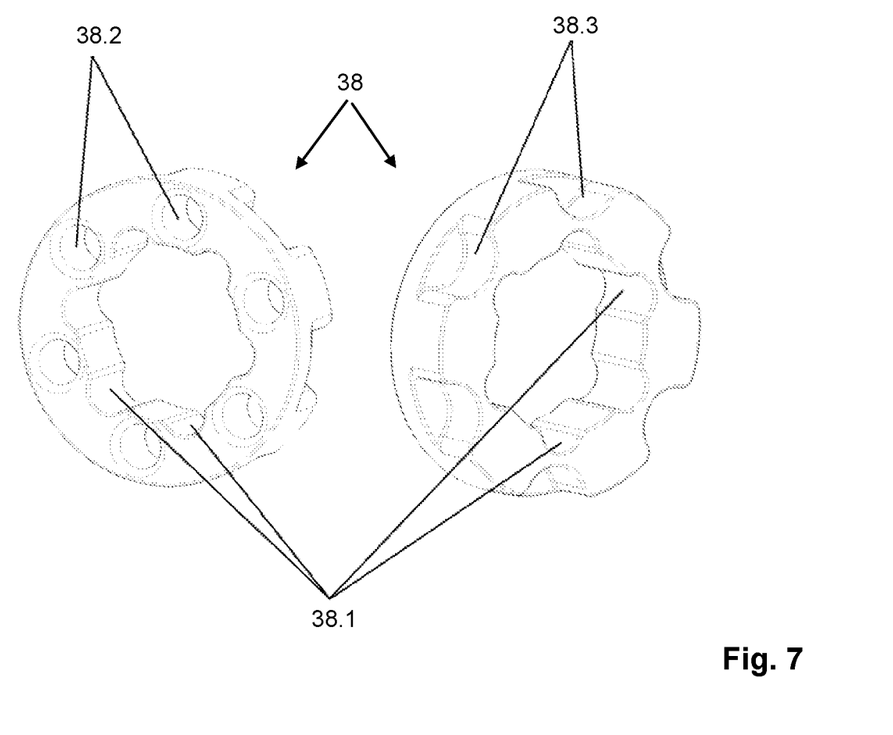
FIG. 7 shows a planetary carrier with flow ducts.

FIG. 7 shows a detailed view of the planetary roller carriers 38, which are of annular formation. The flow ducts 38.1 are uniformly distributed along the longitudinal axis of the planetary roller carriers 38 on their inside diameter. According to the disclosure at least one flow duct 38.1 is provided, a plurality of flow ducts advantageously being provided; in this example six flow ducts 38.1 are provided, allowing an exchange of lubricant. The flow ducts 38.1 are of groove-shaped formation and in cross section have a radial path. The planetary roller carriers 38 have recesses 38.2 in the direction of the planetary rollers, in which the planetary rollers are braced and supported. The flow ducts 38.1 are arranged circumferentially offset in relation to the recesses 38.2. Here a flow duct 38.1 is arranged between each two adjacent recesses 38.2. In addition, the planetary roller carriers 38 have rotational braces 38.3, which are operatively connected to the sleeve.

The substantially complete flooding of the planetary roller screw drive 1 makes it possible to dispense with any sealing of the planetary roller carrier 7.

The embodiments according to the disclosure described herein advantageously results in a permanent exchange of lubricant and heat energy transfer between the planetary roller screw drive and the outside. Lubrication of the rolling contacts is ensured. Ageing of the grease inside the planetary roller screw drive is advantageously prevented. The overall space gained from the grease saved may be used for further planetary rollers.

LIST OF REFERENCE NUMBERS 1 actuator
2 housing
3 electronics housing
4 connector
5 electric motor housing
6 pressure sensor connection
7 fixing eye
8 pressure sensor
9 outlet
10 pressure line
11 slave cylinder
12 clutch release device
13 clutch
14 housing part, fluid housing
15 fluid reservoir
16 housing cover
17 volume equalization element
18 hydraulic fluid
19 seal
20 electric motor
21 stator
22 rotor
23 bearing
24 piston
25 planetary rollers
26 spindle
26.1 external thread
27 rotational brace
28 circuit board
29 rotational brace
30 seal
31 cylinder chamber
32 seal
33 wall
34 referencing spring
35 spring sleeve
36 internal ring gear
37 sleeve
37.1 flange
38 planetary roller carrier
38.1 flow duct
38.2 recess
38.3 rotational brace
39 coil spring
40 anti-twist safeguard
41 axial bearing
44 rear edge, edge
49 venting holes
50 opening
51 dry chamber

The invention claimed is:

1. An actuator having a planetary roller screw drive, the actuator comprising: a housing having a cylinder chamber, a piston having a seal with a moving sealing lip supported on a wall of the cylinder chamber, and a fluid reservoir, wherein the fluid reservoir and the cylinder chamber form one common volume and the housing is filled with a hydraulic fluid and the planetary roller screw drive comprises a spindle having a profiling, the profiling meshing with a plurality of planetary rollers arranged around the spindle axially parallel to the spindle and each of the plurality of planetary rollers is supported in a respective recess of a planetary roller carrier, wherein the piston is fixed to an end of the spindle, wherein the plurality of planetary rollers mesh with an inner profiling of an internal ring gear surrounding the plurality of planetary rollers, and wherein the plurality of planetary rollers are supported in a sleeve surrounding the internal ring gear, the planetary roller carrier including one or more flow ducts-connecting an interior and an exterior of a chamber defined radially by the sleeve and axially by the planetary roller carrier, the planetary roller carrier includes recesses configured to receive rotational braces extending from the sleeve.

2. The actuator as claimed in claim 1, wherein the one or more flow ducts are formed in a groove shape on an inside diameter of the planetary roller carrier along a longitudinal axis of the planetary roller carrier.

3. The actuator as claimed in claim 2, wherein the one or more flow ducts are arranged circumferentially offset in relation to the respective recesses.

4. The actuator as claimed in claim 3, wherein each of the one or more flow ducts is arranged between two adjacent recesses of the respective recesses.

5. The actuator as claimed in claim 1, wherein brake fluid is used as the hydraulic fluid.

6. The actuator as claimed in claim 5, wherein additives are added to the brake fluid for optimum lubrication.

7. A planetary roller screw drive for an actuator, comprising:
a spindle having an external threaded profile;
a piston fixed to an end of the spindle, the piston having a seal that is configured to move with the piston;
a plurality of planetary rollers arranged around, and axially parallel to, the spindle, wherein the plurality of planetary rollers is configured to mesh with the external threaded profile of the spindle and mesh with an inner profile of a ring gear surrounding the plurality of planetary rollers; and
a planetary roller carrier arranged to rotatably support each of the plurality of planetary rollers in a respective recess and including at least one flow duct formed on an inside diameter of the planetary roller carrier along a longitudinal axis thereof, the planetary roller carrier includes recesses disposed on an outside diameter which are configured to receive rotational braces extending from a sleeve.

8. The planetary roller screw drive as claimed in claim 7, wherein the at least one flow duct is arranged to connect an interior and an exterior of a chamber defined radially by the sleeve surrounding the ring gear and axially by the planetary roller carrier.

9. The planetary roller screw drive as claimed in claim 8, wherein the planetary roller carrier is received in an area of the sleeve facing radially inward at an end.

10. The planetary roller screw drive of claim 7, wherein the ring gear transmits axial forces from the plurality of planetary rollers into the sleeve surrounding the ring gear via axial bearings.

* * * * *